US012158287B2

(12) United States Patent
Boros et al.

(10) Patent No.: US 12,158,287 B2
(45) Date of Patent: Dec. 3, 2024

(54) ELECTRIC WATER HEATER HAVING INTERNAL HEAT CONCENTRATOR

(71) Applicant: Rheem Manufacturing Company, Atlanta, GA (US)

(72) Inventors: Jozef Boros, Montgomery, AL (US); Arthur Y. Hinton, Pike Road, AL (US); Raheel A. Chaudhry, Montgomery, AL (US); Gary A. Elder, Montomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 17/958,572

(22) Filed: Oct. 3, 2022

(65) Prior Publication Data

US 2023/0024550 A1 Jan. 26, 2023

Related U.S. Application Data

(62) Division of application No. 15/242,406, filed on Aug. 19, 2016, now Pat. No. 11,460,220.

(51) Int. Cl.

| | |
|---|---|
| ***F24H 1/18*** | (2022.01) |
| ***F24H 1/20*** | (2022.01) |
| ***F24H 9/00*** | (2022.01) |
| ***F24H 9/20*** | (2022.01) |
| ***F24H 15/174*** | (2022.01) |
| ***F24H 15/219*** | (2022.01) |

(Continued)

(52) U.S. Cl.
CPC ............. *F24H 1/181* (2013.01); *F24H 1/202* (2013.01); *F24H 9/0021* (2013.01); *F24H 9/2021* (2013.01); *F24H 15/219* (2022.01); *F24H 15/238* (2022.01); *F24H 15/37* (2022.01); *F24H 15/421* (2022.01); *H05B 1/0244* (2013.01); *F24H 15/174* (2022.01); *F24H 15/395* (2022.01); *F24H 15/407* (2022.01); *F24H 15/45* (2022.01)

(58) Field of Classification Search
CPC ........ F24H 1/181; F24H 1/202; F24H 9/0021; F24H 9/2021
USPC ......................... 392/450, 449, 451, 452, 453
See application file for complete search history.

(56) References Cited

U.S. PATENT DOCUMENTS 4,282,421 A * 8/1981 Hadar ..................... F24H 1/202 392/452
6,370,328 B1 * 4/2002 Mottershead ......... F24H 9/0021 392/452

(Continued)

FOREIGN PATENT DOCUMENTS

CN 201083426 Y * 7/2008
CN 201753981 U 3/2011

(Continued)

OTHER PUBLICATIONS

Machine translation of CN 201083426 performed on Jun. 15, 2023.*
Machine translation of CN 202092294 performed on Jun. 15, 2023.*

*Primary Examiner* — Nathaniel E Wiehe
*Assistant Examiner* — Alba T Rosario-Aponte
(74) *Attorney, Agent, or Firm* — Eversheds Sutherland (US) LLP

(57) ABSTRACT

A water heater has one or more heating elements and an internal wall that causes an increased rate of heating within a sub-volume within the water heater tank. Water from the sub-volume is directed to the tank outlet.

15 Claims, 6 Drawing Sheets

(51) Int. Cl.

| | |
|---|---|
| ***F24H 15/238*** | (2022.01) |
| ***F24H 15/37*** | (2022.01) |
| ***F24H 15/395*** | (2022.01) |
| ***F24H 15/407*** | (2022.01) |
| ***F24H 15/421*** | (2022.01) |
| ***F24H 15/45*** | (2022.01) |
| ***H05B 1/02*** | (2006.01) |

(56) References Cited

U.S. PATENT DOCUMENTS

| | | | | |
|---|---|---|---|---|
| 7,570,877 | B1 | 8/2009 | Huang | |
| 9,702,585 | B2 | 7/2017 | Hayden et al. | |
| 2013/0193221 | A1 * | 8/2013 | Buescher ........... | G05D 23/1931 237/8 A |
| 2017/0268800 | A1 | 9/2017 | Hayden et al. | |

FOREIGN PATENT DOCUMENTS

| | | | |
|---|---|---|---|
| CN | 202092294 | U * | 12/2011 |
| CN | 103062891 | A | 4/2013 |

* cited by examiner

ELECTRIC WATER HEATER HAVING INTERNAL HEAT CONCENTRATOR

CROSS-REFERENCE TO RELATED APPLICATIONS

The present application is a divisional of U.S. application Ser. No. 15/242,406, filed Aug. 19, 2016, which is incorporated herein by reference.

TECHNICAL FIELD

The present invention relates generally to electric water heaters.

BACKGROUND

Electric water heaters are used to heat and store a quantity of water in a storage tank for subsequent on-demand delivery to plumbing fixtures such as sinks, bathtubs, showers, and appliances in residential and commercial buildings. Electric water heaters typically utilize one or more electric resistance heating elements to supply heat to the tank-stored water under the control of a mechanical or electrical thermostat device that monitors the temperature of the stored water.

Storage-type electric water heaters typically include one or more heating elements to which electric current may be applied to thereby generate resistive heating. Both elements, assuming there are two, extend into the tank volume so that water within the tank receives heat directly from the elements. A control system controls the connection of electric current to the heating elements responsively to a comparison of water temperature to predetermined temperature set points. For example, the water heater may include a temperature sensor as a thermistor or bimetallic switch disposed on the outer surface of the water tank proximate a respective heating element so that the temperature sensor is responsive to temperature of water in the tank near the heating element. In the case of a bimetallic switch, the switch is configured to open at a predetermined high temperature (i.e. the high set point temperature) and close at a predetermined low temperature (i.e. the low set point temperature). In turn, the bimetallic switch controls the operation of a switch in the electric current path between line current and the heating element. Thus, if the bimetallic switch detects that water in the tank is at or below the lower set point, the bimetallic switch closes, thereby closing the switch in the electric current path and providing electric current to the heating element. This causes the heating element to generate resistive heat, thereby increasing temperature of water in the tank. The bimetallic switch continues to sense the tank water's temperature as that temperature increases. When the switch detects that the temperature has reached the high set point, the switch opens, thereby opening the circuit switch and disconnecting the electric current source from the heating element and, therefore, deactivating the heating element. The bimetallic switch remains closed as the tank water cools but opens again when the now-cooler water reaches the low set point, and the cycle repeats. A similar process occurs through operation of the bimetallic switch at the lower heating element. In water heaters using thermistors, the respective thermistors at the two heating elements output signals to a water heater controller that compares the temperatures represented by the signals to high and low set points stored in memory and controls relays that, in turn, open and close switches in the electric current paths between line current and the heating elements. The processor controls activation of the electric current switches responsively to the temperature signals from the thermistors to thereby activate the heating elements when the cooling tank water reaches the low set point and deactivate the heating elements when the now-heating water reaches the high set point, similar to the cycles executed by the bimetallic switches.

As indicated above, the upper and lower heating elements are actuated independently of each other, depending on the temperature of water proximate the respective heating elements. Typically, cold water from a pressurized municipal water source is injected into the water heater tank in the bottom half of the tank, whereas the hot water outlet is typically at the top half of the tank. As valves downstream of the hot water outlet are opened, thereby allowing the flow of hot water from the upper part of the tank, cold water under pressure from the municipal water source enters the lower part of the tank. For this reason, and because cooler water is more dense than warmer water, cooler water has a tendency to collect in the lower part of the tank. Consequently, the lower heating element typically cycles on and off more frequently than does the upper element. As the lower heating element warms water in the lower part of the tank, that water rises, causing a circulation of water within the tank that trends water temperature toward equalization over time.

The two heating elements, when active, contribute heat to the water in the tank at a rate determined by the configuration of the elements and the electric current flow to those elements. The amount of heat received by water in the tank about the heating elements, per unit volume, also depends on the temperature of the water at any given moment and the total volume of water into which the heat is transferred. When a valve is opened in the hot water distribution system, downstream from the tank's hot water outlet, such that cold water from the municipal source flows into the bottom of the tank and warmer water flows out from the upper part of the tank into the hot water distribution system, as discussed above, water temperature in the tank begins to drop. This, in turn, causes actuation of the heating elements. As a result, the heating elements transfer heat to the now-cooling water as hot water is removed. Generally, at the maximum water output flow rate, hot water is removed at such a rate that the heat transferred to the tank water by the heating elements is insufficient to indefinitely maintain the outflowing water at the desired warm temperature. Thus, water flowing out of the tank from the hot water outlet fitting cools over time, eventually reaching a temperature considered cold by the user. For example, consider the question how much hot water can be output from a 55 gallon water heater in a one hour period of time, where the tank water is initially hot and the water exiting the tank is considered hot if it remains above a certain temperature (e.g., the low set point or a fixed temperature, such as 100° F.). Generally, the water heater can output water in the hot condition (i.e. over the predetermined temperature) over the one hour period until some amount of water has been removed from the tank. Due to the action of the heating elements, this amount of water might (but might not) be greater than the tank water volume capacity. As should be understood, water heaters may be rated (First Hour Rating, or FHR) based upon the amount of water that the water heater outputs before reaching the predetermined temperature.

The accompanying drawings, which are incorporated in and constitute a part of this specification, illustrate one or more embodiments of the invention and, together with the description, serve to explain the principles of the invention

SUMMARY OF THE INVENTION

The present invention recognizes and addresses considerations of prior art constructions and methods.

In one embodiment, a water heater has a tank having an outer wall and being capable of holding water within a volume defined by the outer wall. The tank defines a water inlet through the outer wall capable of permitting ingress of water into the outer wall volume and a water outlet through the outer wall capable of permitting egress of water from the outer wall volume. At least one heating element is disposed in the outer wall volume. An inner wall is disposed within the outer wall volume proximate the heating element so that the inner wall retains a sub-volume of water within the outer wall volume adjacent the heating element. The sub-volume is in fluid communication with water in the outer wall volume outside the sub-volume so that pressure of water in the outer wall volume outside the sub-volume is applied to water in the sub-volume. A conduit extends from the sub-volume to the water outlet so that when a pressure that is lower than pressure within the outer wall volume is presented at the water outlet, water flows from the sub-volume to the water outlet via the conduit. The inner wall is disposed with respect to the heating element so that the heating element contributes heat to water drawn through the water outlet at a heat input rate greater than the heat input rate in absence of the wall and the conduit.

A method of heating water includes providing a tank capable of holding water within a first volume defined by the tank. At least one heating element is provided within the first volume. A wall is provided within the volume, disposed proximate the at least one heating element so that the wall retains a second volume within the first volume adjacent the heating element and so that, upon actuation of the at least one heating element, the at least one heating element transfers heat to the second volume. Water is drawn out of the tank directly from the second volume so that, upon activation of the at least one heating element, the heating element contributes heat to the water drawn out of the tank at a heat input rate that is greater than the heat input rate if water is drawn from the first volume in absence of the wall.

In a further embodiment, a water heating device has a tank capable of holding water, an inlet to the tank, an outlet to the tank, and an upper heating element disposed inside a chamber within the tank so that the chamber holds water adjacent the upper heating element. A lower heating element is located within the tank below the upper heating element. A flow sensor is configured to detect a flow of water downstream of the inlet. A first temperature sensor is configured to detect a first temperature of the water between the heating chamber and the outlet. A controller is configured to regulate application of a power supply to the upper heating element as a function of the first temperature.

In a still further embodiment, a water heating device has a tank capable of holding water, an inlet to the tank, an outlet to the tank, and an upper heating element disposed inside a chamber within the tank so that the chamber holds water adjacent the upper heating element. A lower heating element is located within the tank below the upper heating element. A first temperature sensor is disposed to detect a first temperature of the water flowing from the heating chamber and out of the outlet. A controller is configured to regulate application of a power supply to the upper heating element as a function of the first temperature.

The accompanying drawings, which are incorporated in and constitute a part of this specification, illustrate one or more embodiments of the invention and, together with the description, serve to explain one or more embodiments of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
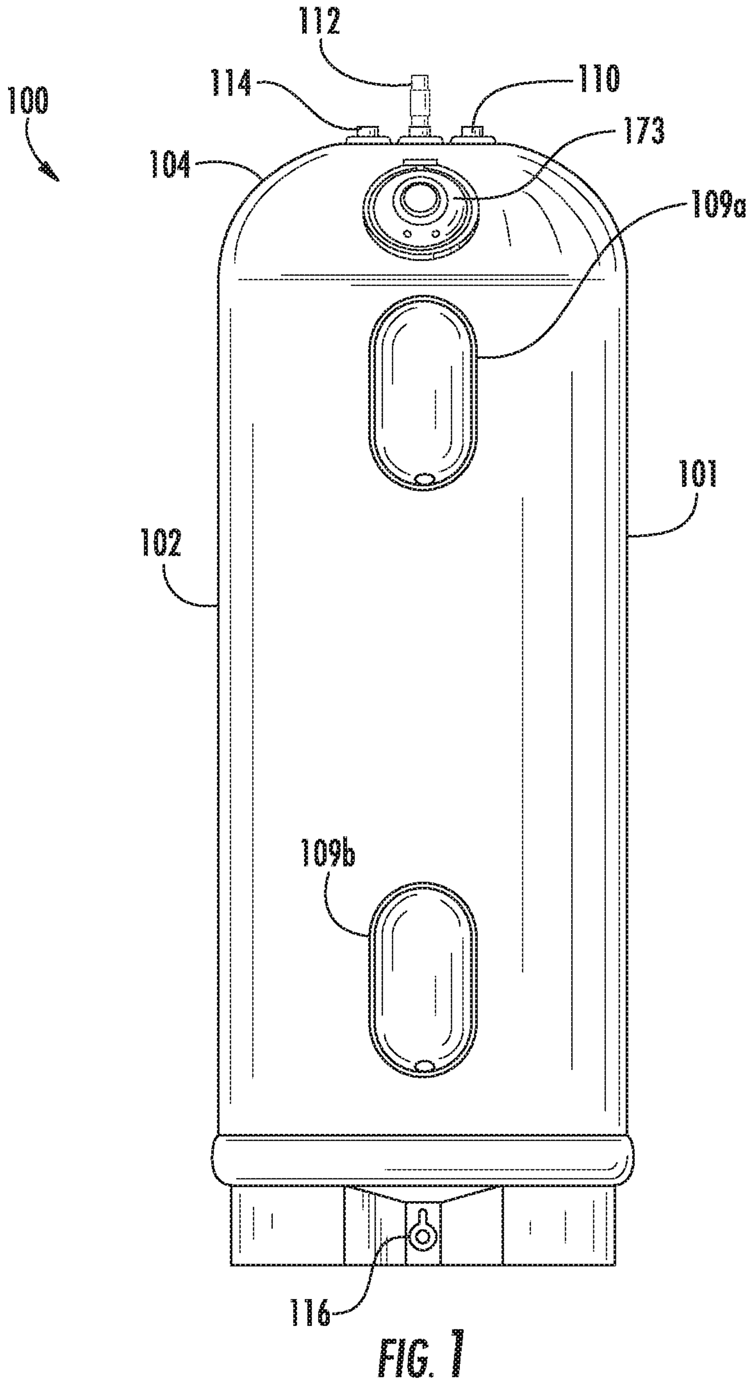
FIG. 1 is a front view of a water heater having an internal heat concentrator in accordance with an embodiment of the present invention.

Repeat use of reference characters in the present specification and drawings is intended to represent same or analogous features or elements of the invention according to the disclosure.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
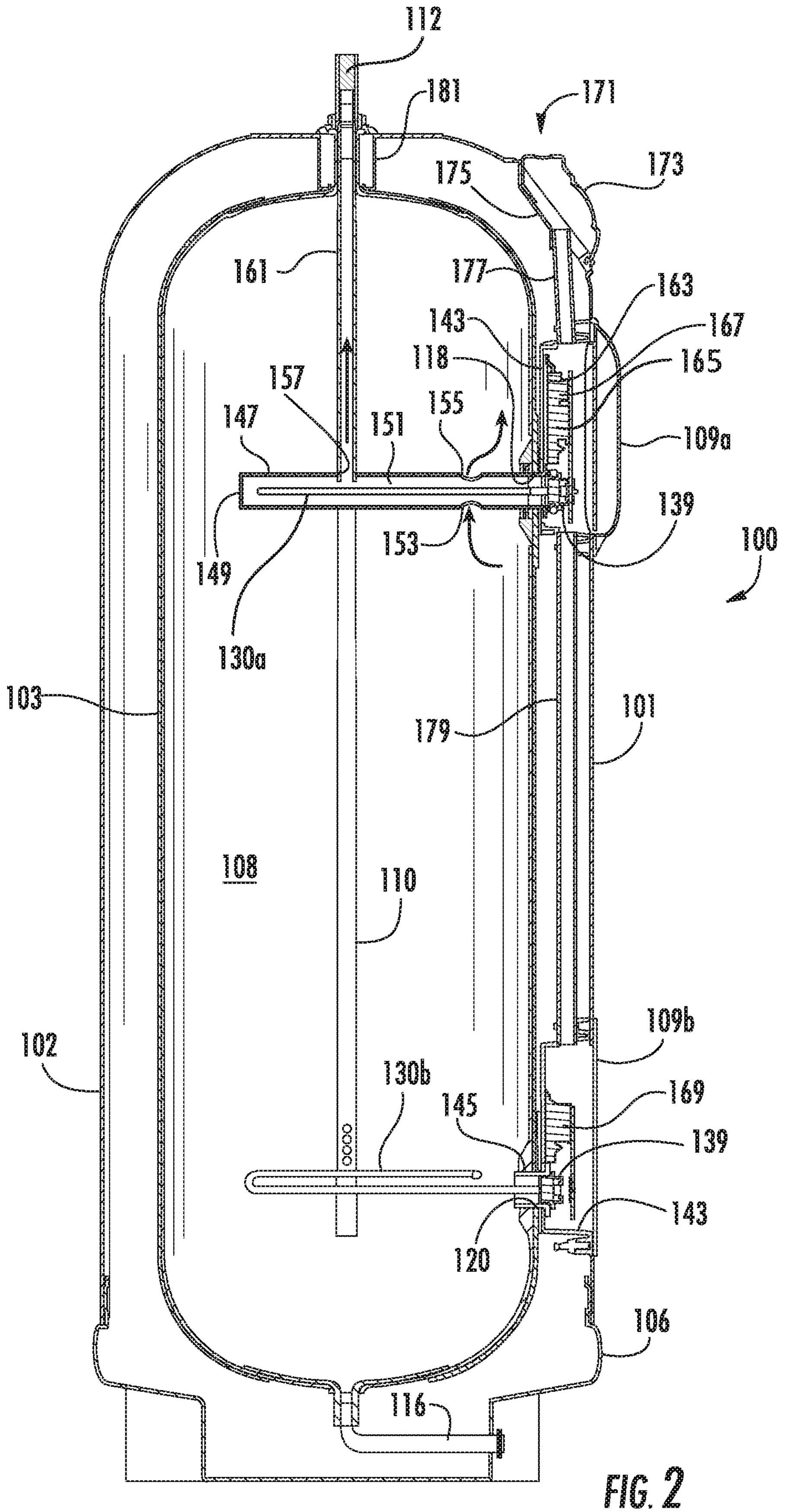
FIG. 2 is a side cross-sectional view of the water heater as in FIG. 1.

As used herein, terms referring to a direction or a position relative to the orientation of the water heater, such as but not limited to "vertical," "horizontal," "upper," "lower," "above," or "below," refer to directions and relative positions with respect to the water heater's orientation in its normal intended operation, as indicated in FIGS. 1 and 2 herein. Thus, for instance, the terms "vertical" and "upper" refer to the vertical direction and relative upper position in the perspectives of FIGS. 1 and 2 and should be understood in that context, even with respect to a water heater that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Referring now to FIGS. 1 and 2, a water heater 100 includes a vertically oriented, generally cylindrical body 101 that is defined by an outer wall having a domed top head portion 104, a bottom pan portion 106, a generally cylindrical side wall 102 extending therebetween and having an annular cross-section in a plane normal to the body's cylindrical center axis (which is vertical in FIG. 1), and a seamless, one-piece liner 103 disposed therein that defines an interior water tank volume 108 for receiving and holding water. Side wall 102 may be considered to encompass liner 103. As shown, side wall 102 is formed of a reinforced polypropylene-based polymer material, but it will be understood from the present disclosure that in other embodiments, other suitable polymer materials may be utilized, as well as steel or other metals, for side wall 102, head 104, and pan 106. Inner liner 103 may be formed from materials common to the construction of water heaters, for example a polymer, a carbon steel outer wall layer with a glass or porcelain enamel inner surface, or an uncoated stainless steel. Wall 147/149 and tube 161 can be made from a suitable polymer or metal, for example stainless steel, and in one embodiment wall 147/149 is made of stainless steel and tube 161 is made of a polymer.

As should also be apparent from the present disclosure, the water heater wall's construction and configuration may vary, and the present disclosure is not limited to the constructions of the specific examples discussed herein. In another embodiment, for example, body 101 is formed of upper and lower body portions that are independently molded and later joined at a seam. The body portions are formed of a double walled construction rather than the wall-and-liner arrangement illustrated in the embodiment of FIGS. 1 and 2. The process by which body portions are manufactured is discussed in greater detail in U.S. Pat. No. 5,923,819, issued Jul. 13, 1999, the entire contents of which are incorporated herein by reference, and a detailed description of the process is therefore not repeated herein.

As shown in FIGS. 1 and 2, a cold water inlet pipe 110, a hot water outlet fitting 112, and a temperature and pressure release valve 114 extend through suitable openings defined in the water heater's domed top head portion 104. A valve drain pipe 116 extends inwardly through bottom pan portion 106. A pair of top and bottom vertically spaced electric resistance heating assemblies 130*a* and 130*b* extend radially inwardly into interior tank volume 108 through a pair of corresponding top and bottom apertures 118 and 120 that are formed in liner 103 and in respective recessed housings 143 that are disposed and extend between liner 103 and side wall 102 of the water heater's body 101. Housings 143 include or cooperate with respective covers 109*a* and 109*b* that cover electrical fittings 139 of electric resistance heating assemblies 130*a* and 130*b*. A cylindrical bushing extends through bottom aperture 120 and is fixed to inner liner 103, for example by welding to a metal liner, mounting to a polymer liner, or connection by other suitable means. Electrical fitting 139 of lower heating element 130*b* defines external threads that cooperate with internal threads on lower bushing 145, so that lower heating element assembly 130*b* can be threadedly secured to liner 103 via bushing 145 and so that the heating element portion of heating element assembly 130*b* can be maintained in position within water tank volume 108.

As described in more detail below, a generally cylindrical interior wall 147 forms a tube with a closed end 149, the wall 147/149 extending through upper aperture 118 and being secured to inner liner 103 by welding, adhesive or other bonding or mounting, or other suitable attachment means. Like bushing 145, the open inner end of cylindrical wall 147/149 is threaded so as to cooperate with external threads on electrical fitting 139 of upper heating element assembly 130*a* so that upper heating element assembly 130*a* can be secured in place at the inner liner and so that the heating element portion of heating element assembly 130*a* extends into water volume 108.

Cylindrical wall 147/149 defines a chamber about the heat-radiating portion of upper heating element assembly 130*a*. The chamber is closed, on one end, by wall portion 149 and, on the other, by the threadedly sealed engagement of electrical fitting 139 with the threads at the otherwise open end of wall portion 147. Cylindrical wall portion 147, in combination with electrical fitting 139 and end wall portion 149, completely encloses a volume of water 151, which may be considered a sub-volume of volume 108, to thereby maintain water within sub-volume 151 adjacent to the heat-radiating portion of heating element assembly 130*a*, except for three apertures 153, 155, and 157. Aperture 153 is located on the underside of cylindrical wall portion 147, while aperture 155 is on the top side, directly opposite aperture 153. Both apertures extend completely through cylindrical wall portion 147, so that each aperture places sub-volume 151 in fluid communication with that portion of volume 108 outside the chamber defined by wall 147/149 and electrical fitting 139.

Aperture 157 receives an open end of an outlet conduit, e.g. a cylindrical tube 161, at a sealed connection. At its opposite end, tube 161 sealingly connects with hot water outlet fitting 112, so that hot water that flows from water tank 100 via hot water fitting 112 draws only from the water in sub-volume 151 via tube 161. That is, in the presently-described embodiment, tube 161 is entirely closed with respect to the volume of water 108 outside sub-volume 151. It should be understood, however, that this is for purposes of example only and that, in other embodiments, tube 161 may include through-vents to allow some amount of water from volume 108 outside sub-volume 151 to flow into tube 161, mixing with water drawn from sub-volume 151. A heat trap (see FIG. 3, 164) may be provided in tube 161.

Each electric resistance heating assembly 130*a*/130*b* includes an electric resistant heating element extending outwardly from a cylindrically-shaped base portion on which the above-described threads are defined and that houses electrical fitting 139. In the illustrated embodiment, the heating element portion is defined in an elongated-U shape, which is illustrated in frontal view in FIG. 2 for bottom heating assembly 130*b* but in side view for upper heating element assembly 130*a*, the difference in orientation being due simply to the rotational position of the heating element assemblies as they are threaded into position. As apparent from FIG. 2, wall 147/149 extends relatively closely about the heating element portion of heating element assembly 130*a* and generally conforms to its geometry. While the stainless steel of wall 147/149 is not a high insulator, it nonetheless inhibits the transfer of heat from water within sub-volume 151 to water in volume 108 outside sub-volume 151 across wall 147/149. Accordingly, while the heating element portion of heating element assembly 130*a* generates heat at the same rate with or without wall 147/149, the insulating effect of wall 147/149 inhibits the transfer of heat in those directions radiating outward from the heating element portion in which wall 147/149 is located. As a result, the volume of water within sub-volume 151 retains a greater amount of heat radiated from heating assembly 130*a* than it would in the absence of wall 147/149. Thus, over a given period of time in a non-flow condition, water in sub-volume 151 may receive and retain a greater amount of heat than it would in absence of wall 147/149.

In a flow condition, when water flows from the tank from outlet fitting 112, wall 147/149 and tube 161 limit the water drawn from the tank to that water flowing through sub-volume 151. That is, rather than drawing water from the upper part of tank volume 108 generally, the output flow draws only from sub-volume 151, drawing from the general upper part of volume 108 only as the larger volume feeds the sub-volume. Thus, all water being drawn out of the water tank flows proximate the upper heating element as defined by the proximity of wall 147/149 to the heating element, or the volume of sub-volume 151 about the heating element. This limits the water draw to water that, being more proximate to the heating element than is the general volume of water in the upper part of tank volume 108 (from which water would be drawn in absence of wall 147/149), will be more quickly heated from the heating element's operation than would be the general volume of water in the upper part of tank volume 108. In other words, consider that the heating element has a heating capacity (Btu/hour), i.e. a capacity to contribute heat to the water around it. If, then, there is a given volume of water into which the heating element contributes that heat and from which the tank draws water to output through the hot water outlet before the water can transfer any or a material amount of the heat received from the heating element to the water in the remaining part of volume 108, the "heat input rate" at which the heating element contributes heat to the water flowing out of the tank through the outlet is the heating element's heating capacity, divided by the given volume (Btu/h/gal). In the absence of wall 147/149, where the water draw from the tank out of fitting 112 is from the general upper part of the storage water tank inner volume 108, the system's heat input rate with respect to the outflowing water is based on the water volume of the general upper part of inner tank volume 108. With wall 147/149 and tube 161, however, and assuming a flow rate of the outflowing water such that water is drawn from sub-volume 151 before a material amount of heat transfers from the outflowing water through wall 147/149 to the remaining part of volume 108, the heating element now contributes the same heating capacity (assuming the heating element remains at the same temperature with or without wall 147/149) to a smaller volume of water, thereby increasing the system's heat input rate with respect to the water flowing out of the water heater. This, in turn, allows the water heater to maintain the outflowing water above the first hour rating (FHR) water temperature (e.g. 100° F.) for a longer period of time than would the water heater in absence of wall 147/149.

Since, as described above, the heat input rate, at which the heating element contributes heat to water flowing out of water outlet fitting 112, is inversely related to the magnitude of sub-volume 151, it may, in a given instance, be desirable for the magnitude of sub-volume 151 to be as small as possible. On the other hand, however, the magnitude of sub-volume 151, if too small, could adversely affect water flow rate out of the tank through outlet fitting 112. Further, the magnitude of sub-volume 151 is directly related to the amount of heat the water within sub-volume 151 can accept and retain from heating element assembly 130*a* in a static water (i.e. non-flow) condition. If heating element assembly 130*a* is actuated when no hot water is flowing out of tank 100, such that a static amount of water surrounds the resistive heating element portion of heating element assembly 130*a* within wall 147/149 (other than convection flow across apertures 153 and 155), the increasingly hot water within sub-volume 151 takes a decreasing amount of heat from the heating element, possibly causing the heating element to increase in temperature. In some embodiments, the magnitude of sub-volume 151 is maintained large enough so that water flow rate through hot water outlet fitting 112 remains at least at a predetermined desired level and so that, during normal cycles of the actuation of heating element assembly 130*a* between the water heater's lower and upper set points, the heating element does not exceed a threshold temperature (which may vary depending on the heating's design and construction and may be determined from the manufacturer or through testing) at which damage to the heating element assembly may begin to occur. As should be apparent from the present disclosure, the particular dimensions of sub-volume 151 defined by wall 147/149 depend upon the particular configuration of a given water heater, including the water's power delivery mechanism. Given such constraints, if, for example, it is desired to minimize the magnitude of sub-volume 151, an optimal volume can be achieved through experimentation.

When no water flows out from hot water fitting 112, it will be understood from the present discussion that water nonetheless flows into and out of sub-volume 151, via apertures 153 and 155, as a result of convection. Accordingly, it should be understood that while the present discussion refers to such conditions as resulting in a "static" volume of water within sub-volume 151, water is being exchanged between sub-volume 151 and that portion of volume 108 outside sub-volume 151. Through such exchange, and through heat transfer across wall 147/149, heating element assembly 130*a* transfers heat to water within volume 108 outside sub-volume 151 when the heating element assembly is actuated while no water is flowing from the tank. Additionally, apertures 153 and 155 communicate water pressure present in volume 108 outside sub-volume 151 to water within sub-volume 151. As should be understood, water within volume 108 is subject to pressure from water provided from a municipal cold water source via water inlet pipe 110. Thus, the opening of a valve at an appliance or faucet in the hot water delivery system downstream from hot water outlet fitting 112 creates a pressure at hot water outlet 112 that is lower than the pressure within volume 108. This pressure differential is communicated to sub-volume 151 via apertures 153 and 155, causing flow of water from sub-volume 151 through tube 161 to the lower-pressure hot water outlet system.

While a generally cylindrical structure of wall 147/149 is illustrated in the figures and discussed herein, it should be understood that the construction and configuration of the chamber surrounding the upper heating element may vary. For example, the wall may enclose only a portion of the heating element, leaving the remaining portion directly exposed in all directions to water within volume 108 outside of sub-volume 151. In still further embodiments, the wall may not completely enclose the heating element at any point along the heating element's length. In such partial-enclosure arrangements, the heating element directly transfers heat both to water within the sub-volume and water in the remaining portions of volume 108, and the boundary between sub-volume 151 and that portion of volume 108 outside sub-volume 151 is not defined entirely by a wall structure. Nonetheless, in such embodiments, the connection between tube 161 and the wall can be disposed such that hot water is drawn from a volume of water that is smaller than the general volume of the upper part of the inner volume 108 from which water would otherwise be drawn in the absence of wall 147/149, that receives all or substantially all of the heat radiated from upper heating assembly 130*a*, and that is drawn into tube 161 for delivery to fitting 112 before being able to transfer any or a material amount of heat from the smaller volume to the remaining general volume of water in the upper part of volume 108, thereby increasing the heat input rate at which the heating element contributes heat to water flowing out of the tank. Thus, all such constructions should be understood to be within the scope of the present disclosure.

A power source provides electric current to the respective heating elements of assemblies 130*a* and 130*b* via electrical fittings 139. A bracket 163 is secured to an outer surface of cylindrical wall portion 147 as it extends outward of inner liner 103. Bracket 163 secures a temperature sensor 165, for example a thermistor, so that the thermistor abuts a bottom surface of its housing 143 or extends through a hole in the bottom of housing 143 so that the thermistor abuts inner liner 103. As indicated in FIG. 2, thermistor 165 is positioned just above upper heating assembly 130*a* so that it detects, through the wall of inner liner 103, the temperature of water proximate the heating element assembly. Bracket 163 also secures a circuit board on which are disposed components, indicated generally at 167, including a power supply and a controller. Also as discussed below, and also as generally indicated at 167, an emergency cutoff device, or "ECO," may be secured by the bracket. A similar bracket may be secured about the portion of bushing 145 extending outward of inner liner 103 to secure and position a second thermistor 169, again either abutting the bottom of its housing 143 or extending through a hole in housing 143 to directly abut inner liner 103. In another embodiment, as illustrated in FIG. 2, lower thermistor 169 is directly secured to housing 143, without need of a bracket.

A DC power source (FIG. 4, 193) within the circuitry indicated at 167 receives AC power from a building mains power source from wiring that extends through a hole 171 in a cover 173 that encloses an upper housing 175 in which a wiring harness (not shown) is disposed. From the wiring harness, electric current is conveyed by wires through an upper conduit 177 to the circuitry indicated at 167, as well as electrical fitting 139 of upper heating element assembly 130*a*. Wiring extending through a lower conduit 179 carries electric current to the electrical fitting of lower heating element assembly 130*b*. Wiring also extending through lower conduit 179 conveys output signals from thermistor 169 to a controller housed at 167.

It will be understood in this art that the volume between inner liner 103 and sidewall 102, head 104, and pan 106 may be filled with foam insulation that is injected as a liquid into the volume and allowed to expand. Housing 143 protects the components disposed therein and described above from being encased in foam, and foam dams, for example as indicated at 181, may be disposed at positions within the volume, for example surrounding water exit tube 161, in which it may be desired to avoid foam. Wiring conduit 177 and 179 also serve this purpose, but it should also be understood that in other embodiments, the conduit may be omitted, so that the wiring is encased in foam.

Figure 3:
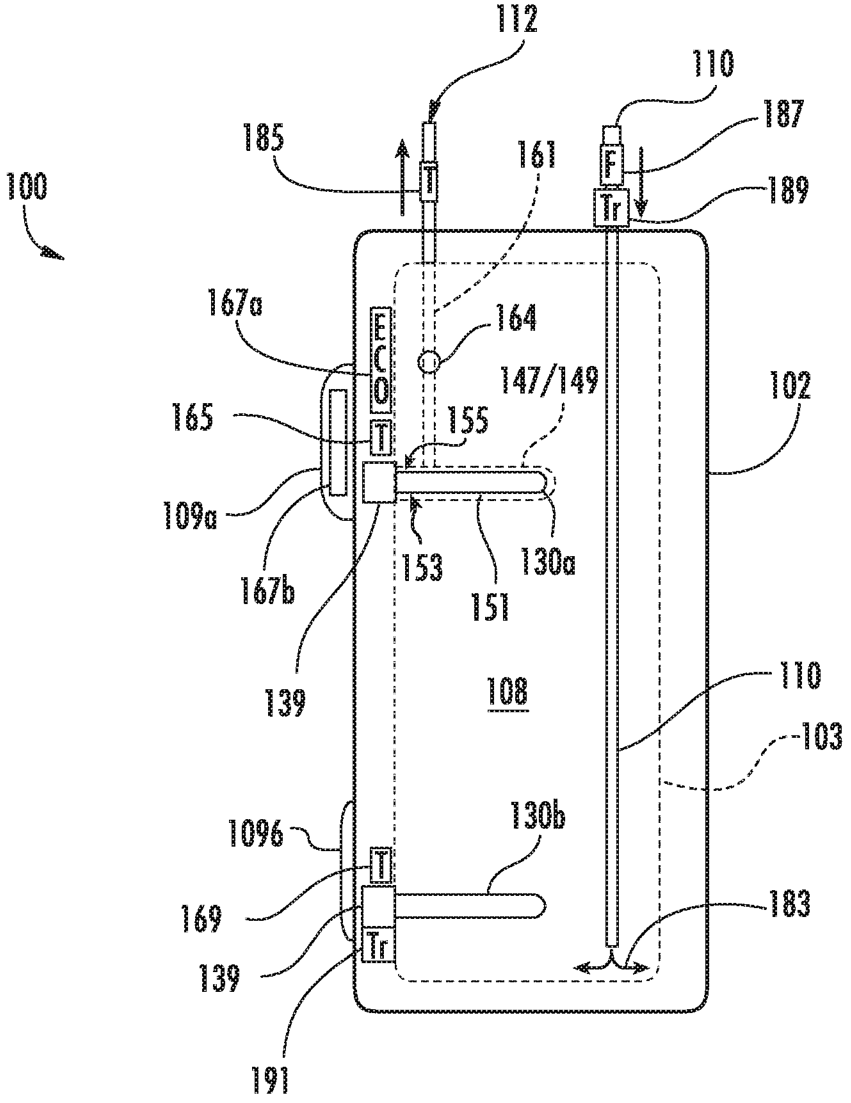
FIG. 3 is a schematic illustration of the water heater as in FIG. 1.

Referring to FIG. 3, during typical operations of water heater 100, cold water from a pressurize source (for example, a municipal cold water supply) flows into water heater interior water tank volume 108 through dip tube 110 as indicated by arrows 183. As indicated, cold water generally enters the tank in the bottom part of volume 108. The pressurized water fills the tank, and heating element assemblies 130*a* and 130*b* heat the water. As should be understood, cooler water is more dense than warmer water, causing the cooler water to move toward the bottom of the volume and warmer water to move toward the top. This convection effect tends to create movement of water within the tank that, over time, tends to equalize temperature across the tank volume. Accordingly, when plumbing fixtures (not shown) to which water heater 100 is connected within the building or other facility within which water heater 100 is installed are inactive, water temperature throughout the tank tends to equalize.

When one or more valves of the hot water outlet system to which water heater 100 is attached via fitting 112 require hot water (i.e., are opened), hot water flows into sub-volume 151 via apertures 153 and 155 in chamber wall 147/149, and through outlet tube 161 and hot water outlet fitting 112 to the hot water supply piping (not shown). The discharge of heated water outwardly through hot water fitting 112 creates a capacity within volume 108 that is correspondingly filled by pressurized cold water that flows downwardly through cold water inlet pipe 110 and into volume 108. This tends to lower the temperature of water in the tank. The cooling water is heated, however, by electric resistance heating assemblies 130*a* and 130*b*. In particular, as described above, because the chamber defined by wall 147/149 and electrical fitting 139 defines a sub-volume (151) of water within volume 108 from which water is partially, primarily, or exclusively drawn out of fitting 112, the heating element and the water in sub-volume 151 form a system in which the heating element contributes heat to the water output through the hot water outlet at a heat input rate greater than would be the case in absence of wall 147/149. In the absence of the chamber, heat generated by heating assembly 130*a* would radiate into the general upper portion of volume 108 without restriction by a wall 147/149. With the chamber, a better heat input rate for the output water is achieved by effectively reducing the volume of water into which the heating element assembly radiates heat (or, concentrating the heat to a smaller water volume) and from which the output water is drawn.

As water is drawn out of hot water outlet fitting 112, water flowing out of the hot water outlet could remain indefinitely at a constant warm temperature if the heating element assemblies could raise the temperature of the now-cooling water in the tank at a sufficient rate before the water flows out of hot water outlet 112. This is, however, generally unattainable when only a single heating element/wall combination is used within a significantly larger storage volume of water, though it is within the scope of the present disclosure to draw water into fitting 112 from multiple heating element/wall combinations via a manifold that draws hot water from multiple tubes 161. Nonetheless, and considering one or more heating elements/wall combinations that are fewer than needed to maintain a constant output water temperature, the inclusion of wall 147/149, to limit the volume of water that directly receives heat from upper heating assembly 130*a* to sub-volume 151, and the drawing of water to hot water outlet 112 only or primarily from sub-volume 151 via outlet tube 161, results in a system that establishes a higher heat input rate for water removed from the tank through hot water outlet fitting 112 than the heat input rate for water being drawn from hot water outlet 112 from the general volume of water volume 108 in the absence of wall 147/149 and tube 161. As a result, for at least a period of time, the water drawn from the tank has a temperature higher than it would have in absence of wall 147/149, and the water heater's FHR increases. The magnitude of the increase depends on the size of the water heater, the flow rate through hot water outlet 112 and the configuration of wall 147/149 relative to the electrical resistance heating element portion of upper heating element assembly 130*a*. As described above, in some embodiments, wall 147/149 is formed as close about the heating element as is possible, to thereby minimize sub-volume 151, while providing a sufficient volume of water about the heating element to prevent overheating of the heating element and to maintain at least the minimum desired water flow rate out of hot water outlet 112.

Figure 4:
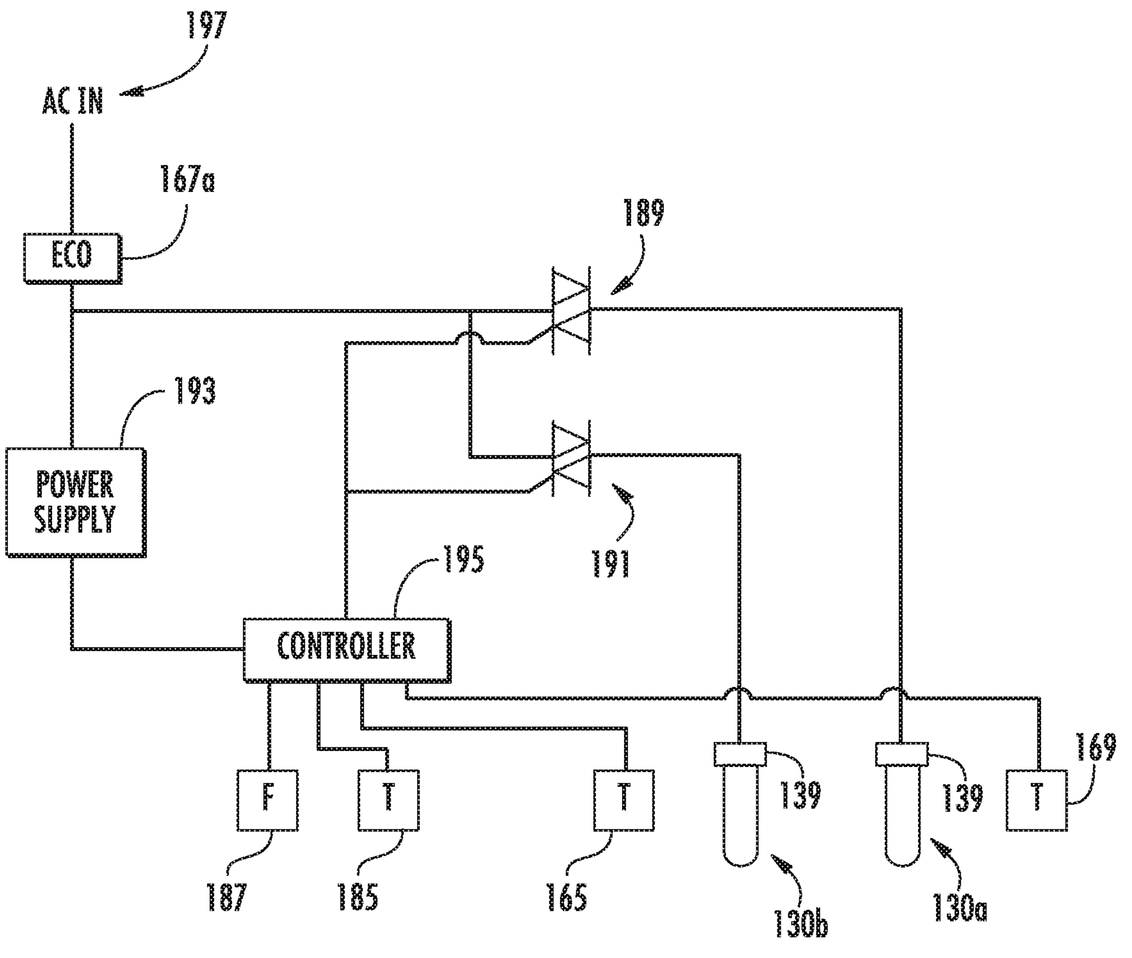
FIG. 4 is a partial schematic illustration of the water heater as in FIG. 1.

Referring to FIGS. 3 and 4, a temperature sensor 185 is disposed on hot water outlet fitting 112. A flow sensor 187 is disposed on inlet tube 110 just outside the body of tank 100. A triac 189 is disposed at the inlet pipe proximate the flow sensor. A second triac 191 is disposed in the lower housing 143. As should be understood, triacs generate heat when in use. Thus, the placement of the triacs on the cold water inlet and at the bottom portion of liner 103 places the triacs opposite cold or relatively cold (with respect to water in the upper part of volume 108) water, so that the triacs contribute heat to the tank water. In other embodiments, however, the triacs are placed on a circuit board with other components shown in FIG. 4. Further, in another embodiment, lower triac 191 may be replaced by a relay, as described below.

While in FIG. 2, the emergency cutoff device and other circuitry is indicated collectively at 167, in FIGS. 3 and 4 the emergency cutoff device is indicated individually at 167*a*. A DC power supply 193 and a controller 195 are disposed on a circuit board located within upper housing 143 (FIG. 2), as indicated at 167*b*. The arrangement of the controller and other electrical components of water heater 100 are illustrated schematically in FIG. 4.

It will be understood from the present disclosure that the functions ascribed to controller 195 may be embodied by computer-executable instructions of a program that is embodied on a computer-readable medium and that executes on one or more computers, for example embodied by a processor such as a microprocessor or a programmable logic controller (PLC). Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a random access memory (RAM), a read-only memory (ROM), an erasable programmable read-only memory (EPROM or flash memory), a non-volatile memory supporting a PLC, memory incorporated into a processor, or other optical or magnetic storage devices. Generally, program modules include routines, programs, components, data structures, etc., that perform particular tasks and/or implement particular abstract data types. Moreover, those skilled in the art will appreciate that the systems/methods described herein may be practiced with various controller configurations, including programmable logic controllers, simple logic circuits, single-processor or multi-processor systems, remote and mobile devices, and the like. Aspects of these functions may also be practiced in distributed computing environments, for example in so-called "smart home" arrangements and systems, where tasks are performed by remote processing devices that are linked through a local or wide area communications network to the components otherwise illustrated in the figures. In a distributed computing environment, programming modules may be located in both local and remote memory storage devices. Thus, controller 195 may comprise a computing device that communicates with the system components described herein via hard wire or wireless local or remote networks and may itself comprise in whole or in part a processing device remote from water heater 100 and that communicates with other components at the water heater wirelessly or by other means.

A controller that could effect the functions described herein could include a processing unit, a system memory and a system bus. The system bus couples the system components including, but not limited to, system memory to the processing unit. The processing unit can be any of various available programmable devices, including microprocessors, and it is to be appreciated that dual microprocessors, multi-core and other multi-processor architectures can be employed as the processing unit.

Software applications may act as an intermediary between users and/or other computers and the basic computer resources of controller 195, as described, in suitable operating environments. Such software applications include one or both of system and application software. System software can include an operating system that acts to control and allocate resources of controller 195. Application software takes advantage of the management of resources by system software through the program models and data stored on system memory.

The controller may also, but does not necessarily, include one or more interface components that are communicatively coupled through the bus and facilitate interaction with the controller. By way of example, the interface component can be a port (e.g., serial, parallel, PCMCIA, USC, or FireWire) or an interface card, or the like. The interface component can receive input and provide output (wired or wirelessly). For instance, input can be received from devices including but not limited to a pointing device such as a mouse, track ball, stylus, touch pad, key pad, touch screen display, keyboard, microphone, joy stick, gamepad, satellite dish, scanner, camera, or other component. Output can also be supplied by controller 195 to output devices via the interface component. Output devices can include displays (for example cathode ray tubes, liquid crystal display, light emitting diodes, or plasma) whether touch screen or otherwise, speakers, printers, and other components. In particular, by such means, controller 195 may receive inputs from, and direct outputs to, the various components with which controller 195 communicates, as described herein.

An AC electrical input source 197 may be a connection to the electric mains from the building in which water heater 100 is located. Emergency cutoff device 167*a* is a temperature sensing device disposed against inner liner 103 so that device 167*a* detects the temperature of water in the upper part of volume 108. Device 167*a* may be, for example, a bimetallic switch that is normally closed but that opens when the temperature of water opposing device 167*a* across the wall of inner liner 103 reaches or exceeds a predetermined temperature defined by the configuration of the bimetallic switch. The bimetallic switch is mechanically connected to a single pole switch so that the single pole switch is closed when the bimetallic switch is closed and the single pole switch is open when the bimetallic switch is open. AC electric current flows through the single pole switch to power supply 193 and triacs 189 and 191. Accordingly, when the bimetallic switch is in its normally-closed condition, the single pole switch is closed, thereby allowing electric current to flow from AC input 197 to DC power supply 193 and triacs 189 and 191 or other switches as may be used in the circuit. When, however, the temperature of water within tank 100 opposite electric cutoff device 167*a* exceeds a predetermined threshold indicating the likelihood that the tank will output water above a predetermined threshold temperature, for example 120° F., the bimetallic switch opens, thereby opening the single pole switch and disconnecting electric current from the power supply and the two triacs. The bimetallic switch may be configured to close where the temperature of water falls back below the high set point, thereby allowing current to again flow to these components and system operation to continue. Alternatively, once the bimetallic switch opens and disables the water heater, the switch remains open until reset by an operator.

Temperature sensor 185, for example a thermistor, is disposed at hot water outlet 112. The output of this temperature sensor is directed to controller 195, which utilizes the temperature sensor output in controlling the operation of upper heating element assembly 130*a*, as described in more detail below.

Power source 193 receives an AC input signal from AC input 197 via emergency cutoff device 167*a* and converts the AC input to a DC power source, for example powering components, such as controller 195, that require DC power. The construction and arrangement of DC power sources should be understood and is, therefore, not discussed in further detail herein.

Figure 5:
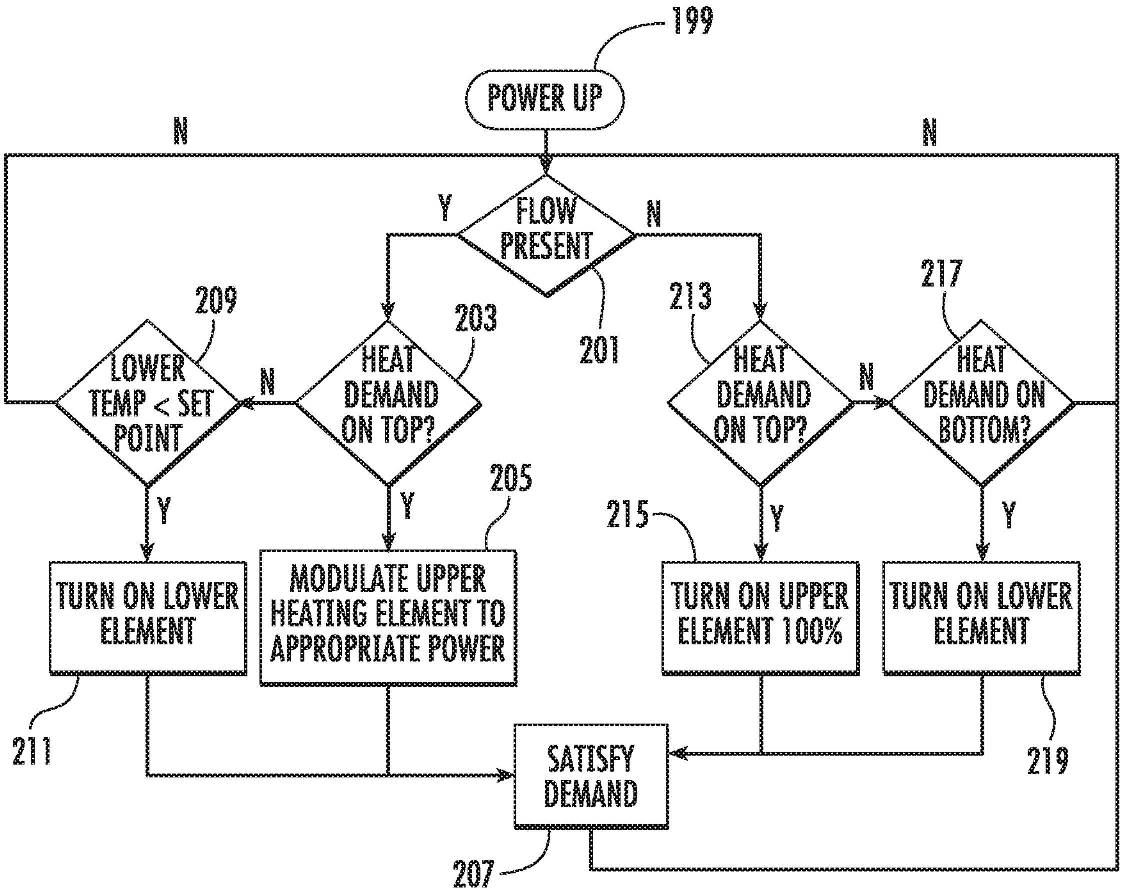
FIG. 5 is a flow diagram of operation of an embodiment of a water heater as in FIG. 1.
Figure 6:
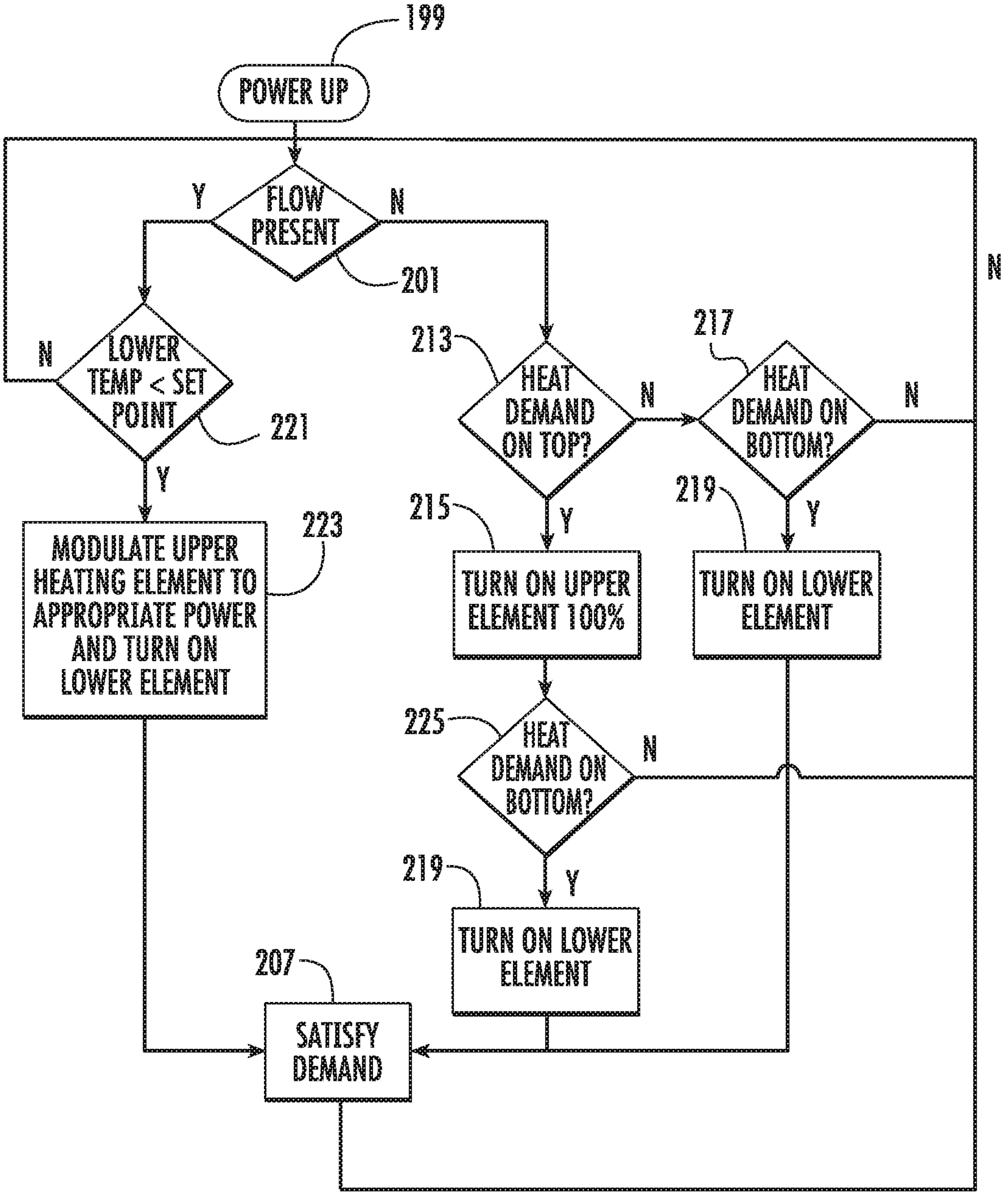
FIG. 6 is a flow diagram of operation of an embodiment of a water heater as in FIG. 1.

Operation of water heater 100 is illustrated at FIGS. 5 and 6. FIG. 5 illustrates the system's operation under a qualification that only one of the two resistance heating element assemblies 130*a* and 130*b* can be actuated at the same time. Accordingly, this is referred to herein as "non-simultaneous" operation of the water heater. FIG. 6 illustrates operation when both heating elements assemblies can be (but are not necessarily) operated simultaneously. Simultaneous operation, which may be preferred in applications where quick heating of water is desirable, draws a higher level of electric current than non-simultaneous operation, and non-simultaneous operation may be utilized where more appropriate for the electrical system with which the water heater is used, for example depending on circuit breaker levels.

Referring to FIGS. 4 and 5, at system power-up at 199, controller 195, at 201, monitors the output of flow sensor 187. As indicated in FIG. 5, the system operates the upper heating element assembly in either of two modes, depending whether flow exists at the input pipe. Because such flow exists only if water is being drawn out of the tank through the hot water outlet fitting, an indication from flow sensor 187 that water is flowing through input pipe 110 is also an indication that water is flowing out of hot water outlet 112 and, therefore, that water is flowing through the chamber defined by wall 147/149 (i.e. that water is flowing through sub-volume 151) and outlet tube 161. In other embodiments, a flow sensor may be disposed at other points along the water flow, for example at hot water outlet fitting 112. In any such arrangement, however, the flow sensor is disposed on the water tank structure along the water flow path, and the flow sensor output therefore indicates flow through the chamber/sub-volume and the outlet tube to and through the hot water outlet.

As described above, utilization of the chamber defined by wall 147/149 results in a higher heat input rate for water flowing out of the water tank than occurs in the absence of the wall. Accordingly, when water flow from the tank begins, actuation of upper resistive heating element assembly 130*a* could initially increase temperature of the water flowing out of hot water fitting 112 to a temperature above the high set point or above a predetermined increment over the high set point. While a temperature above the high cutoff point would be detected by temperature sensor 185 (FIG. 3), as described below, thereby causing controller 195 to deactivate triac 189, or both triacs 189 and 191, until temperature at the hot water outlet falls below the low set point, re-activation of the upper heating element assembly at that point could repeat the cycle and, thereby, prevent utilization of the upper heating assembly. Accordingly, when the system detects a need to actuate the upper heating element assembly under a condition in which water is flowing out of the hot water outlet fitting, the control system modulates the power provided to upper heating element assembly 130*a* to thereby prevent water exiting the hot water outlet fitting from exceeding a predetermined high temperature.

More specifically, at system power-up at 199, controller 195, at 201, receives the output of flow sensor 187. If at 201, controller 195 determines from the flow sensor output that flow is present through the water heater, and therefore through hot water outlet fitting 112, controller 195 checks, at 203 whether there is a demand for activation of upper heating element assembly 130*a*. To do this, controller 195 compares the output signal from temperature sensor 185, which is proximate water flowing out of fitting 112 and through an outlet pipe so that temperature sensor 185 detects temperature of water flowing from sub-volume 151 proximate the heating element, to the water heater's low set point. The water heater's low and high set points are stored in memory associated with controller 195.

If the actual temperature for the water proximate upper heating element assembly 130*a*, as indicated by the signal from temperature sensor 185, is at or below the water heater's low set point, controller 195, at step 205, controls the operation of triac 189 to apply a modulated power level to upper resistive heating element 130*a* to bring the water flowing from hot water outlet fitting 112 to the desired temperature i.e., the high set point. The controller's modulation of the triac's operation is based upon the following relationship:

$$\text{Power (Watts)}=(\text{Flow Rate (gal/min)}\times\Delta T(°\text{ F.})\times\text{Specific Heat (BTU/lb-° F.)}\times\text{density (lb/gal)}\times 60\text{ (min/hr)})/(3.412\text{ ((BTU/hr)/Watt)}\times\text{heating element efficiency}),$$

where (in the present example):

ΔT=High Set Point Temperature−Actual Temperature (from sensor 169)

Water Specific Heat=1 BTU/lb-° F.

Water Density=8.33 lb/gal

Heating element thermal efficiency=0.98

Thus:

$$\text{Power (Watts)}=(\text{Flow Rate}\times\Delta T\times 1\times 8.33\times 60)/(3.412\times 0.98)$$

This relationship defines the power at which the upper heating element should be operated in order to contribute to the water an amount of heat equal to the difference between the water's present temperature and the high set point temperature. Controller 195 can detect the actual flow rate from flow sensor 187. Alternatively, flow sensor 187 may output only a signal indicative of whether or not there is water flow, without information indicating flow rate. In such an embodiment, a maximum flow rate may be assumed based upon calibration of the system with all possible hot water outlets open and flow measured from outlet 112. Either method accounts for any constriction upon flow rate imposed by wall 147/149 and outlet tube 161.

As should be understood, the desired power level is also a function of electric current and resistance. The resistance of resistive heating element assembly 130*a* is known, as is the current from electric current source 197. Accordingly, controller 195 modulates the operation of triac 189 by activating the triac and allowing the triac to deactivate via control of the triac's gate current, so that in each of repeated periods of time, the triac is active only for a percentage of that period of time equal to the ratio of the electric current level defined by the desired power level determined above and the heating element's resistance, to the electric current level from current source 197. That is, a desired power level as described above corresponds to a respective modulation, based on a ratio of desired to actual electric current.

Processor 195 can determine flow rate dynamically, based upon the formula above, each time flow is determined. Alternatively, power levels, and their associated modulation levels, can be determined in system calibration for a series of combinations of flow rates and temperature differences, whereby a lookup table is stored in the memory that relates each possible combination of flow rate and temperature difference with a modulation level. Thus, given flow rate and temperature measurements, controller 195 can look up the predetermined modulation level.

Upon setting the modulation at step 205, the controller checks the output of temperature sensor 185 and compares the measured temperature to the high set point, at step 207. If the measured temperature is below the high set point, the controller maintains the modulated electric current flow to the heating element, thereby maintaining the heating element in an actuated state, and returns to step 201. If flow remains present at step 201, the controller assumes heat demand at 203, recalculates and modifies (if needed) the current modulation level at 205, and again checks the output of temperature sensor 185 at 207 against the upper set point. If that comparison shows that the water temperature at sensor 185 remains below the high set point, the controller returns to 201, and the loop continues. If, during this process, the output of the flow sensor indicates at 201 that there is no flow, the controller deactivates triac 189 and checks for the condition at step 213, as described below. When, at 207, the water temperature as reflected by sensor 185 meets or exceeds the high set point, controller 195 removes the gate signal to triac 189, allowing the triac to close and thereby deactivating heating element assembly 130*a*. Controller 195 then returns to step 201.

If, at step 203, there is no demand for heating at the upper heating element assembly as reflected by the signal from sensor 185, controller 195 checks the output of lower temperature sensor 165, at step 209. If the temperature indicated by this output signal is greater than the water heater's low set point temperature, no water heating is called for, and controller 195 returns to step 201. If, however, the temperature indicated by temperature sensor 165 is less than or equal to the water heater's low set point temperature, then, at step 211, controller 195 actuates triac 191 to allow electric current flow from electric current source 197 to lower heating element assembly 130*b*. The actuation of lower heating element assembly 130*b* is not modulated, so that the heating element is actuated to full capacity. In this regard, in another embodiment, lower triac 191 is replaced by a relay that can be switched by controller 195 between fully open and fully closed states. Controller 195 again checks the output of temperature sensor 165 at 207 to determine the temperature of water proximate lower heating element assembly 130*b*. If the measured temperature is less than the high set point, controller 195 maintains triac 191 in its non-modulated, conducting state and returns to step 201. If flow remains present at 201, the controller assumes no heat demand at 203, assumes heat demand at 209, maintains power to the lower heating element at 211, and again checks the output of temperature sensor 165 at 207 against the high set point. If that comparison shows that the water temperature at sensor 165 remains below the high set point, the controller returns to 201, and the loop continues. If, during this process, the output of the flow sensor indicates at 201 that there is no flow, the controller deactivates triac 191 and checks for the condition at step 213. When, at step 207, the water temperature indicated by temperature sensor 165 is at or above the high set point, controller 195 closes triac 191, via control of its gate current, thereby deactivating lower heating element assembly 130*b*. Controller 195 then returns to step 201.

If, at step 201, no water flow is indicated by flow sensor 187, controller 195, at step 213, determines the temperature of water proximate upper heating assembly 130*a* through the output of temperature sensor 169 and compares that temperature to the low set point. If, as described above, that measured temperature is at or below the low set point, thereby indicating a demand for heat from the upper heating element assembly, controller 195 turns triac 189 to its conducting state, at step 215, without modulation. The controller checks the temperature signal from sensor 169 at 207. If the water temperature is below the high set point at 207, the controller maintains triac 189 active and returns to 201. If flow remains present at 201, the controller assumes continued heat demand at 203, maintains triac 189 active at 215, and again checks the output of temperature sensor 169 at 207, and the loop continues. When the temperature from sensor 169 reaches or exceeds the high set point at 207, the controller deactivates triac 189 and returns to 201.

If, at step 213, there is no demand for heating at the upper heating element assembly, controller 195 compares the temperature indicated from temperature sensor 165 to the water heater's low set point temperature, at step 217. If that comparison indicates that the measured temperature is at or below the water heater's low set point, the controller actuates triac 191, without modulation, to thereby actuate lower heating element assembly 130*b*, at step 219. The controller checks the output of temperature sensor 165 at 207. If the water temperature is below the high set point at 207, the controller maintains triac 191 active and returns to step 201. If flow remains present at 201, the controller assumes no heat demand at 213, assumes heat demand at 217, maintains triac 191 active at 219, and again checks the output of temperature sensor 165 at 207, and the loop continues. When the temperature at 207 reaches or exceeds the water heater's high set point temperature, the controller deactivates triac 191 and returns to 201.

Referring to the simultaneous operation of the heating element assemblies, as indicated at FIG. 6, and still with reference to FIG. 4, if, at 201, controller 195 detects flow from flow sensor 187, controller 195 may actuate both heating element assemblies 130*a* and 130*b*, through control of triacs 189 and 191. More specifically, at step 221, controller 195 checks the output of temperature sensor 185 at the hot water outlet fitting or proximate hot water outlet pipe and compares the temperature indicated by the sensor's output to the water heater's low set point temperature. If that temperature is above the low set point, the controller does not activate the triacs and returns to step 201. If, however, the measured temperature is at or below the low set point, the controller sets triac 191 to a non-modulated open state and determines a modulation level for upper heating element assembly triac 189, as discussed above, at step 223. The controller checks the temperature signal from sensor 185 at 207 and compares the corresponding temperature to the high set point temperature. If the measured temperature from sensor 185 is below the high set point, the controller maintains both triacs in their actuated state and returns to 201. If flow remains present at 201, the controller assumes a heat demand at 221, recalculates and resets (if needed) the modulation level for triac 189 at 223, maintains triac 191 in its fully conductive state at 223, and again checks the temperature from sensor 185 against the high set point. If that temperature remains below the high set point, the controller returns to 201, and the loop continues. If, at 207, the output from sensor 185 indicates the output flow water temperature has reached or exceeded the high set point temperature, controller 195 deactivates both triacs, thereby deactivating both heating element assemblies, and returns to step 201.

If, at step 201, controller 195 detects no flow from flow sensor 187, the controller executes the sequence of steps 213, 215, 217 and 219, as indicated in FIG. 6 and as described above with respect to FIG. 5. As a result, if there is no heating demand for the upper heating element, the control system may still actuate the lower heating element through steps 217 and 219. Thus, there is a possible non-simultaneous actuation of the heating elements within the overall simultaneous operation of FIG. 6. A similar result occurs if the upper heating element is activated at steps 213 and 215, in that the controller may or may not activate the lower heating element assembly simultaneously with the upper heating element assembly. More specifically, following step 215, controller 195, at step 225, checks the output of temperature sensor 165 and compares that temperature with the water heater's low set point. If the lower water temperature is above the low set point, such that there is no demand for heating by the lower heating element assembly, controller 195 maintains triac 191 in an off state and returns to step 201. Assuming that the flow sensor continues to show no flow present, controller 195 returns to step 213. Since steps 217 and 225 could result in the controller not checking for the high set point at 207, controller 195 at this step 213 assumes that water temperature is above the low set point but checks the output of temperature sensor 169 against the high set point. If the temperature is below the high set point, such that continued heating is needed, the upper heating element is maintained in full operation at 215, and the controller checks the output of lower temperature sensor 165 against the low set point, at 225. If the temperature from sensor 169 is above the high set point at 213, the controller deactivates the upper heating element and checks the output of lower temperature sensor 165 against the low set point, at 217. If the temperature from sensor 165 is below the low set point at 217, or if the temperature from sensor 169 is below the low set point at 225, the controller returns to 201, and the loop continues.

If, at 225, the temperature from lower temperature sensor 165 is below the lower set point, the controller controls triac 191 to a fully closed state and maintains the closed state so that the lower heating element is activated in a full, non-modulated condition, at 219. At 207, the controller checks the temperature signals of both sensors 169 and 165 against the high set point. If either sensor indicates a temperature above the high set point, the triac for that heating element is deactivated. If either sensor indicates a temperature below the high set point, the triac for that heating element is maintained active. Assume, then, that the lower heating element is active, and the upper heating element is inactive, when the controller returns to 201. At 213, the controller checks the output of temperature sensor 169 against the low set point and responds thereto as described above. Depending on the result of that comparison, the controller at 217 or 225 assumes a heating demand at the lower heating element, maintains the lower heating element's triac active at 219, and again checks the temperature signals from sensors 169 and 165 against the high set point at 207.

Assume, alternatively, at 201, that the lower heating element is inactive, and the upper heating element is active. At 213, the controller again assumes a water temperature above the low set point and checks the output of temperature sensor 169 against the high set point, as described above. Depending on the result of that comparison, the controller at 217 or 225 checks the output of temperature sensor 165 against the low set point, and the loop continues.

Assume a condition in which the controller activates the lower heating element, or maintains the lower heating element in an active state, via step 217. When the controller then moves to 207, the lower heating element is active and the upper heating element is inactive. Thus, at 207, the controller checks the output of lower temperature sensor 165 against the high set point. If the temperature is below the high set point, the controller maintains triac 191 in an active state and returns to step 201. If there remains no flow, the controller checks the output of upper temperature sensor 169 against the low set point at 213 and, depending on the comparison, activates triac 189 to activate the upper heating element at 215 and moves to 225, or maintains triac 189 in an inactive state and moves to 217. Upon either path, the controller assumes a heat demand for the lower heating element, and the loop continues as discussed above.

If both outputs for temperature sensors 169 and 165 indicate temperatures at or above the high set point at 207, the controller deactivates both triacs 189 and 191 and returns to 201. If, during this process, the flow sensor switches from no-flow to flow at 201, the controller deactivates both triacs 189 and 191, and moves to step 221.

Accordingly, in the simultaneous operation description illustrated in FIG. 6, simultaneous operation of both heating element assemblies is forced if water flow is detected at step 201 but is optional, depending on the respective actual water temperatures of the upper and lower portions of the tank, if no flow is present.

While one or more preferred embodiments of the invention are described above, it should be appreciated by those skilled in the art that various modifications and variations can be made in the present invention without departing from the scope and spirit thereof. For example, in a further embodiment, wall 147/149 and conduit 161 are omitted, and controller 195 normally activates and deactivates the upper and lower heating elements in response to the comparison of the outputs of the upper and lower temperature sensors to the high and low set points. Upon start up, in a non-simultaneous mode, the controller checks the upper element temperature sensor. If its temperature output indicates a temperature lower than the lower set point, the controller activates the upper heating element and then repeatedly checks the upper temperature sensor temperature against the high set point. When the temperature reaches or exceeds the high set point, the controller deactivates the upper heating element and checks the lower temperature sensor against the low set point. If the lower temperature sensor indicates a temperature below the low set point, the controller activates the lower heating element and then repeatedly checks the lower temperature sensor temperature against the high set point. When the temperature reaches or exceeds the high set point, the controller deactivates the lower heating element and returns to check the status of the upper heating element. Overarching these loops, the controller repeatedly checks the flow sensor output, and if the flow sensor output changes from indicating a no-flow condition to indicating a flow condition, the controller immediately activates the upper heating element, or both the upper and lower heating elements, provided that a temperature sensor at the hot water outlet pipe is below the upper set point. If that temperature sensor indicates the outflowing water is at or above the upper set point, the controller does not activate either heating element until the outflowing water temperature drops below the upper set point temperature. At that point, the controller activates the upper heating element (or both heating elements) until the temperature sensor at the water outlet indicates the water is at or above the high set point, the flow sensor indicates no flow, or a predetermined period of time expires. Accordingly, it should be understood that the elements of one embodiment may be combined with another embodiment to create a still further embodiment. It is intended that the present invention cover such modifications and variations as come within the scope and spirit of the present disclosure, the appended claims, and their equivalents.

That which is claimed is:

1. A water heating device comprising:

a tank configured to hold water, the tank having an inlet and an outlet;

an upper heating element disposed inside a heating chamber within the tank so that the heating chamber holds water adjacent the upper heating element, wherein the upper heating element extends radially inward into the tank;

a lower heating element within the tank, the lower heating element located below the upper heating element;

a hot water discharge conduit disposed within the tank and extending vertically from a first end to a second end, wherein the first end of the hot water discharge conduit is attached to an internal outlet in the heating chamber and the second end of the hot water discharge conduit is attached directly to the outlet of the tank, wherein the hot water discharge conduit has a length that is perpendicular to the upper heating element, and wherein the hot water discharge conduit is closed with respect to the water in the tank outside the heating chamber;

a flow sensor configured to detect a flow of water downstream of the inlet;

a first temperature sensor configured to detect a first temperature of the water between the heating chamber and the outlet; and a controller configured to regulate application of an electric power supply to the upper heating element as a function of the first temperature.

2. The water heating device of claim 1, which is configured such that heated water exiting the internal outlet of the heating chamber solely feeds water to the hot water discharge conduit.

3. The water heating device of claim 1, which is configured to operate the upper heating element and the lower heating element simultaneously.

4. The water heating device of claim 1, which is configured to operate the upper heating element and the lower heating element non-simultaneously.

5. The water heating device of claim 1, further comprising computer readable media which stores program instructions and wherein the program instructions are configured so that the controller, in executing the program instructions, controls a switch between the electric power supply and the upper heating element to thereby apply power (P) to the upper heating element according to a formula:

$$P=\text{FlowRate}\times\Delta T\times\text{Specific Heat}\times\text{Density}/\text{Efficiency}$$

wherein:

FlowRate=rate of flow of water from the outlet,

ΔT=difference in temperature between a predetermined temperature and the first temperature, Specific Heat=specific heat of water, Density=density of water, and Efficiency=efficiency of the upper heating element.

6. The water heating device of claim 1, wherein heat demand is on the upper heating element in non-simultaneous operation during the flow of fluid.

7. A water heater comprising:

a tank capable of holding water;

an inlet to the tank;

an outlet to the tank;

an upper heating element disposed inside a heating chamber within the tank so that the heating chamber holds water adjacent the upper heating element, wherein the upper heating element extends radially into the tank;

a lower heating element within the tank, the lower heating element located below the upper heating element;

a hot water discharge conduit disposed within the tank and extending vertically from a first end to a second end, wherein the first end of the hot water discharge conduit is attached to an internal outlet in the heating chamber and the second end of the hot water discharge conduit is attached directly to the outlet of the tank, wherein the hot water discharge conduit has a length that is perpendicular to the upper heating element, and wherein the hot water discharge conduit is closed with respect to the water in the tank outside the heating chamber;

a first temperature sensor disposed to detect a first temperature of the water flowing from the heating chamber and out of the outlet; and a controller configured to regulate application of a power supply to the upper heating element as a function of the first temperature.

8. The water heater of claim 7, which is configured such that heated water exiting the internal outlet of the heating chamber solely feeds the hot water discharge conduit.

9. The water heater of claim 7, which is configured to operate the upper heating element and the lower heating element non-simultaneously.

10. The water heater of claim 7, further comprising computer readable media storing program instructions and wherein the program instructions are configured so that the controller, in executing the program instructions, controls a switch between the power supply and the upper heating element to thereby apply power (P) to the upper heating element according to a formula:

$$P=\text{FlowRate}\times\Delta T\times\text{Specific Heat}\times\text{Density}/\text{Efficiency}$$

wherein:

FlowRate=rate of flow of water from the outlet,

ΔT=difference in temperature between a predetermined temperature and the first temperature, Specific Heat=specific heat of water, Density=density of water, and Efficiency=efficiency of the upper heating element.

11. The water heater of claim 1, wherein:

the tank comprise a top end, an opposing bottom end, and a vertical sidewall extending between the top and bottom ends;

the tank is configured to hold water within a primary volume defined by at least the vertical sidewall and the top and bottom ends;

the outlet is located on the top end;

the heating chamber has an elongated shape and is disposed within the primary volume.

12. The water heater of claim 11, wherein:

the heating chamber defines a secondary volume and comprises at least one longitudinal sidewall extending horizontally between a first end and an opposed second end;

the at least one longitudinal sidewall comprises a plurality of apertures, which comprise a first aperture, a second aperture, and a discharge aperture; and the secondary volume is in direct fluid communication with the primary volume via only the plurality of apertures.

13. The water heater of claim 12, wherein the upper heating element is disposed inside the heating chamber and is configured to transfer heat directly to water within the secondary volume.

14. The water heater of claim 13, wherein (i) an internal volume of the hot water discharge conduit is only in fluid communication with the secondary volume of the chamber, (ii) the hot water discharge conduit is located entirely within the primary volume, and (iii) when a pressure at the outlet is lower than a pressure of water in the primary volume, water flows from the primary volume and into the chamber via the plurality of apertures, and from the chamber to the outlet via the hot water discharge conduit.

15. The water heater of claim 13, further comprising:

a cold water inlet conduit having an inlet end and an outlet end, wherein the inlet end is connected to the water inlet, the cold water inlet conduit extending from the inlet end vertically past the upper heating element and the lower heating element to the outlet end located beneath the lower heating element, wherein the cold water inlet's length extends perpendicular to the upper heating element.

* * * * *